United States Patent
Lamping et al.

(10) Patent No.: US 7,203,668 B2
(45) Date of Patent: Apr. 10, 2007

(54) SYSTEMS AND METHODS FOR EFFICIENT AMBIGUOUS MEANING ASSEMBLY

(75) Inventors: John O. Lamping, Los Altos, CA (US); Richard S. Crouch, Cupertino, CA (US); Mary Dalrymple, San Carlos, CA (US); Hadar Shemtov, Palto Alto, CA (US)

(73) Assignee: Xerox Corporation, Stamford, CT (US)

( * ) Notice: Subject to any disclaimer, the term of this patent is extended or adjusted under 35 U.S.C. 154(b) by 984 days.

(21) Appl. No.: 10/322,504

(22) Filed: Dec. 19, 2002

(65) Prior Publication Data

US 2004/0122658 A1    Jun. 24, 2004

(51) Int. Cl.
*G06F 17/00*    (2006.01)
*G06N 5/02*    (2006.01)

(52) U.S. Cl. .............................. 706/46; 706/14; 706/12

(58) Field of Classification Search .................. 706/46, 706/14, 12; 704/3
See application file for complete search history.

(56) References Cited

U.S. PATENT DOCUMENTS

| | | | |
|---|---|---|---|
| 5,438,511 A | 8/1995 | Maxwell, III et al. | |
| 5,727,222 A | 3/1998 | Maxwell, III et al. | |
| 5,819,210 A | 10/1998 | Maxwell, III et al. | |
| 5,903,860 A | 5/1999 | Maxwell, III et al. | |
| 6,064,953 A | 5/2000 | Maxwell, III et al. | |
| 6,684,201 B1 * | 1/2004 | Brill | 706/45 |
| 6,947,918 B2 * | 9/2005 | Brill | 706/45 |
| 2005/0234703 A1* | 10/2005 | Brill | 704/4 |

OTHER PUBLICATIONS

Mark Hepple, Memoisation for Glue Language Deduction and Categorial Parsing, 1998, COLING-ACL '98, 538-544.*
Vineet Gupta et al, Efficient Linear Logic Meaning Assembly, Proceedings of the Thirty-sixth Annual Meeting of the Association for Computational Linguistics and Seventeenth International Conference on Computational Linguistics, XP-002388585, 464-470.*
M. Hepple, "A Functional Interpretation Scheme for D-Tree Grammars," *Proceedings of the Third International Workshop on Computational Semantics (IWCS-3)*, pp. 1-14, KUB, Tilburg, Jan. 1999.

(Continued)

*Primary Examiner*—Joseph P Hirl
(74) *Attorney, Agent, or Firm*—Oliff & Berridge, PLC

(57) ABSTRACT

Techniques managing syntactic and semantic ambiguity allow two different kinds of processing and representation of ambiguity to work together. The techniques allow linear logic semantic assembly to work with packed functional (f) structures and provide for contexted version of linear logic where semantic contributions are read from the packed functional (f) structure and pre-pended with the contents of the functional (f) structure to which they pertain. Linear logic reasoning may then be performed in the contexted linear logic to derive possible meanings from the contexted contributions from the packed functional (f) structure. Deductions in the contexted linear logic do not require fully expanding each syntactic parse. Techniques applying skeleton/modifier techniques to contexted reasoning are provided by creating a contexted modifier applicable only for certain syntactic readings. These techniques recognize both quantifier scope ambiguity and attachment ambiguity in a representation that uses efficient skeleton/modifier representation where possible and contexted representation otherwise.

7 Claims, 6 Drawing Sheets

OTHER PUBLICATIONS

M. Hepple, "Memoisation for Glue Language Deduction and Categorial Parsing," *COLING-ACL '98*, pp. 538-544 Montreal, 1998.

A. Frank et al., "GlueTag Linear Logic based Semantics for LTAG—and what it teaches us about LFG and LTAG," *Proceedings of the LFG01 Conference*, University of Hong Kong, Hong Kong, 2001.

A. Asudeh et al., "Glue Semantics for HPSG," *On-line Proceedings of HSPG '01 Conference*, 2002.

L. O'Gorman, "Secure Identification Documents Via Pattern Recognition and Public-Key Cryptography," *IEEE Transactions on Pattern Analysis and Machine Intelligence*, vol. 20, No. 10, pp. 1097-1102, Oct. 1998.

Richard Crouch and Josef Van Genabith, "context change, underspecification and structure of glue language derivations," Semantics and Syntax in Lexical Functional Grammar (M. Dalrymple Ed, MIT, MA, USA, 1999), XP002388583.

Tsutomu Fujinami, "A decidable linear logic for transforming DRSs in context," Proceedings of the 11th Amsterdam Colloquium (Paul Dekker and Martin Stokhof, Eds.), XP002388584, URL:http://citeseer.ist.psu.edu/tsutomu97decidable.html (retrieved Jul. 4, 2006).

Vineet Gupta and John Lamping, "Efficient linear logic meaning assembly," Proceedings of the Thirty-Sixth Annual Meeting of the Association for Computational Linguistics and Seventeenth International Conference on Computational Linguistics (Montreal, Canada), XP002388585, URL:http://citeseer.ist.psu.edu/161597.html (retrieved Jul. 4, 2006).

Mark Hepple, "Memoisation for Glue Language Deduction and Categorial Parsing" Proceedings of the COLING-ACL '98 Joint Conference (The 17th International Conference on Computational Linguistics, and 36th Annual Meeting of the Association for Compuational Linguistics), XP002388669, pp. 538-544. URL:http://acl.ldc.upenn.edu/P/P98/p98-108 8.pdf (retrieved Jul. 5, 2006).

Mary Dalrymple, John Lamping, Fernando Pereira and Vijay Saraswat, "Quantifiers, Anaphora and Intensionality," Journal of Logic, Language and Computation (Kluwer Academic Publishers, The Netherlands, 1997), vol. 6, XP002388586, pp. 219-273, URL:http://dx.doi.org/10.1023/A:1008224124 336 (retrieved Jul. 4, 2006).

Dick Crouch, Anette Frank and Josef Van Genabith, "Linear Logic Based Transfer and Structural Misalignment," 4th International Workshop on Computational Semantics (N H C Bunt, I Van Der Sluis, and E Thusse, Eds., University of Tilburg, The Netherlands), XP002388587, URL:http://citeseer.ist.psu.edu/crouch01linear.html (retrieved Jul. 4, 2006).

Mary Dalrymple, "Meaning and Semantic Composition," Syntax and Semantics. Lexical Functional Grammar (Academic Press, San Diego, CA, USA), XP002388593, pp. 217-254, URL:http://ww.standford.edu/group/nasslli/courses/as-cr-da/apbook-nasslli.pdf (retrieved Jul. 4, 2006).

Ash Asudeh and Richard Crouch, "Glue Semantics for HPSG," Proceedings of the 8th International Conference on Head-Driven Phrase Structure Grammar (Norwegian University of Science and Technology, Trondheim, Norway), XP002388588, URL:http://www2.parc.com/istl/members/crouch/glueHPSG.pdf (retrieved Jul. 4, 2006).

* cited by examiner

SYSTEMS AND METHODS FOR EFFICIENT AMBIGUOUS MEANING ASSEMBLY

BACKGROUND OF THE INVENTION

1. Field of Invention

This invention relates to efficiently assembling the meanings of words and phrases in natural language such that both syntactic ambiguity and semantic scope ambiguity can be represented.

2. Description of Related Art

For a single sentence, thousands of syntactic analysis may be available. Similarly, tens of thousands of semantic analyses may also exist for each syntactic analysis. Therefore, the combination of syntactic and semantic ambiguities results in an exponential increase in the number of possible readings for a sentence. Human beings perform an unconscious filtering out of many of these sentence readings. However machine based systems are unable to perform this filtering. Instead, machine based systems must have some representation technique of explicitly representing the syntactic and semantic ambiguity which does not require enumerating the exponentially large number of combinations and which provides for effective processing.

Lexical Functional Grammar uses syntactic structures called functional structures or f-structures to represent individual syntactic analyses. In the Xerox Language Environment, syntactic ambiguity is captured in a single syntactic structure called a packed f-structure by incorporating context variables to show how common substructures are shared between different analyses. The Xerox Language Environment uses packed f-structures to capture lexical and attachment syntactic ambiguity.

However, neither f-structures nor packed f-structures represent semantic information or semantic ambiguity such as semantic quantifier scope ambiguity. Therefore, a technique called Linear Logic Meaning Assembly or Glue Semantics was developed to derive representations of semantic information from f-structures. Substructures within the f-structure contribute premises pairing word meanings with formulas in linear logic. A process of linear logic deduction combines these premises to pair a sentence meaning with the f-structure. Linear Logic Meaning Assembly can derive alternative meanings from a single f-structure constituting a single syntactic analysis of a sentence that exhibits quantifier scope ambiguity and/or other types of semantic ambiguity. Moreover, Linear Logic Meaning Assembly can be used to derive a single, efficient, skeleton-modifier representation of all the possible meanings of a single f-structure constituting a single syntactic analysis of a sentence.

However, the methods used to represent quantifier scope and semantic ambiguity use different features than the methods used to represent syntactic ambiguity. Accordingly, these methods do not lead to the derivation of a single efficient semantic representation representing the combination of all possible syntactic ambiguities with all possible semantic ambiguities. Accordingly, for a given sentence two representation structures are necessary. One representation structure is necessary to represent all possible syntactic ambiguities and another representation structure is necessary to represent all semantic ambiguities.

SUMMARY OF THE INVENTION

Accordingly, techniques that allow the semantic analysis of Linear Logic Meaning Assembly to work with the packed functional or f-structures of semantic analysis would be advantageous. Similarly, techniques for translating the packed functional or f-structure syntactic attachment ambiguities into the type of ambiguity representable by the Linear Logic would also be useful.

Various exemplary embodiments according to this invention provide for semantic analysis of Linear Logic Meaning Assembly to work with packed functional or f-structures by adopting a contexted version of linear logic. Linear logic premises contributed by substructures within a packed f-structure are pre-pended with context variables from the packed f-structure. Linear Logic analysis is then performed in the contexted linear logic to derive the possible meanings from the contributions that have had pertinent context pre-pended. Therefore, through the translation of the packed functional or f-structure into a contexted linear logic, the representation supports propositions with a shared contextualized structure while also preserving the packed functional or f-structure. Thus, deductions using the contexted linear logic do not require fully expanding out each syntactic parse.

Additionally, a skeleton/modifier representation of ambiguity may be derived in the contexted linear logic by deducing each modifier type semantic contribution and removing it from further processing to generate a contexted modifier applicable only for certain syntactic readings. This method provides for quantifier scope ambiguity and attachment ambiguity in a representation of ambiguity that uses the efficient skeleton/modifier representation where possible and the contexted representation for the remaining cases.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Ambiguity occurs throughout natural language and can arise from both syntactic and semantic sources. A single sentence may have thousands of syntactic analyses and tens of thousands of semantic analyses. The shared analyses arise from common and shared sub-analyses being combined in different ways.

Mechanisms for managing syntactic ambiguity by computing the shared sub-analyses once and then using context variables to indicate the different possible combinations of shared sub-units are disclosed in U.S. Pat. Nos. 5,438,511; 5,727,222; 5,819,210; 5,903,860 and 6,064,953, each hereby incorporated by reference in its entirety.

Figure 1:
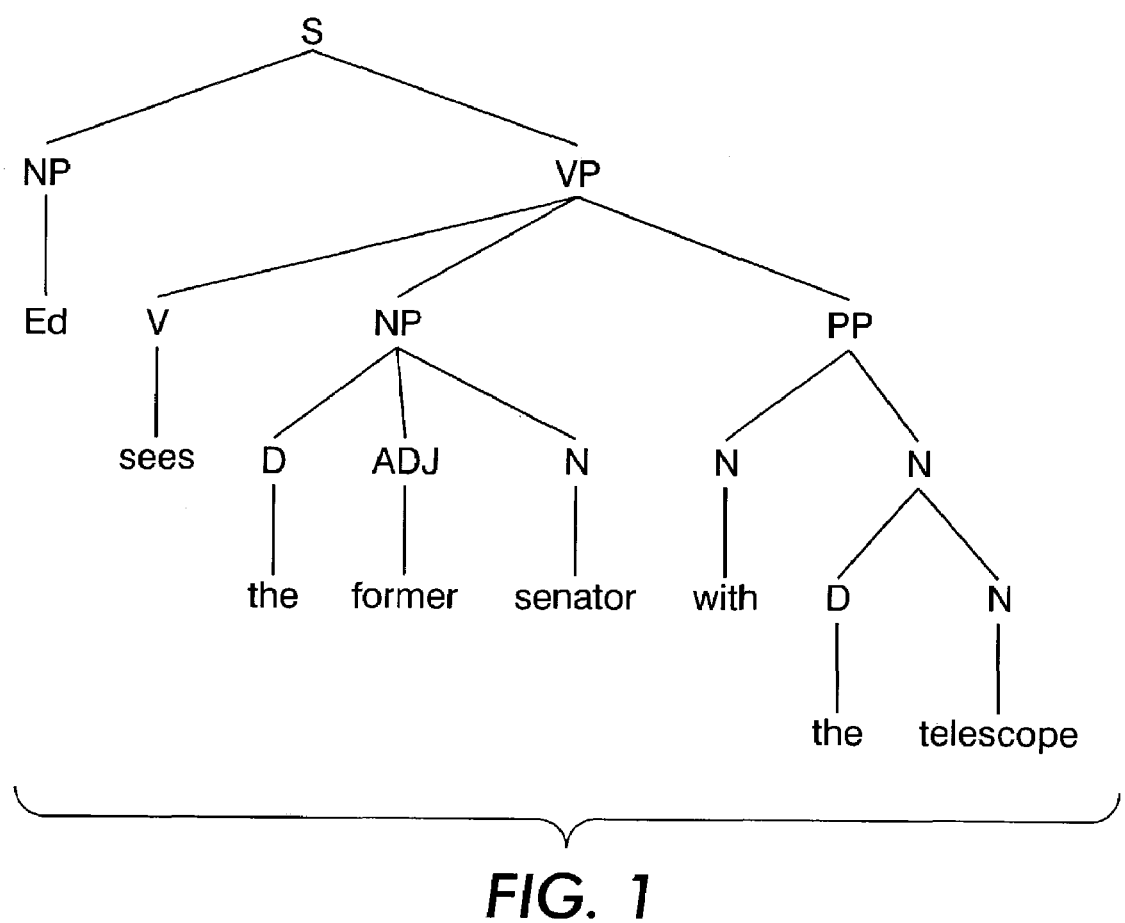
FIG. 1 is a first exemplary constituent structure or c-structure of an exemplary ambiguous sentence.

For example, the sentence, "Ed sees the former senator with the telescope" contains two syntactic analyses. In the first case, the prepositional phrase "with the telescope" modifies the noun phrase "the former senator" to indicate that the former senator has the telescope. This analysis is shown in the constituent or c-structure of FIG. 1 and the functional or f-structure shown in FIG. 2.

Figure 3:
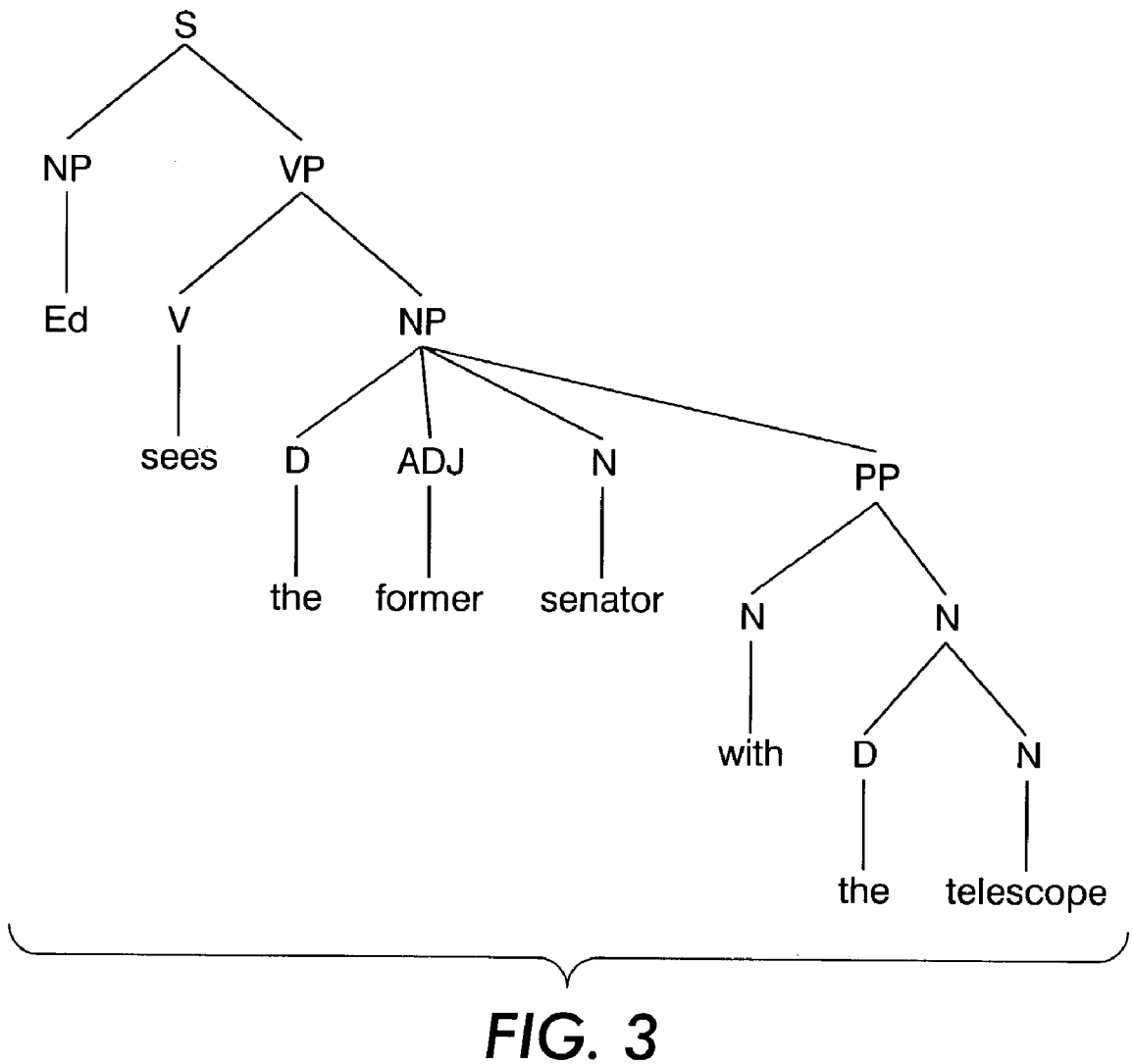
FIG. 3 is a second exemplary constituent structure or c-structure of an exemplary ambiguous sentence.

In the second case, the prepositional phrase "with the telescope" modifies the verb phrase "sees the former senator" to indicate that Ed is looking through the telescope to see the former senator. This is shown in the constituent structure of FIG. 3 and the functional structure of FIG. 4. The shared sub-units or phrases "with the telescope", "the former senator", and "Ed sees . . . " receive the same analyses in both cases.

Figure 5:
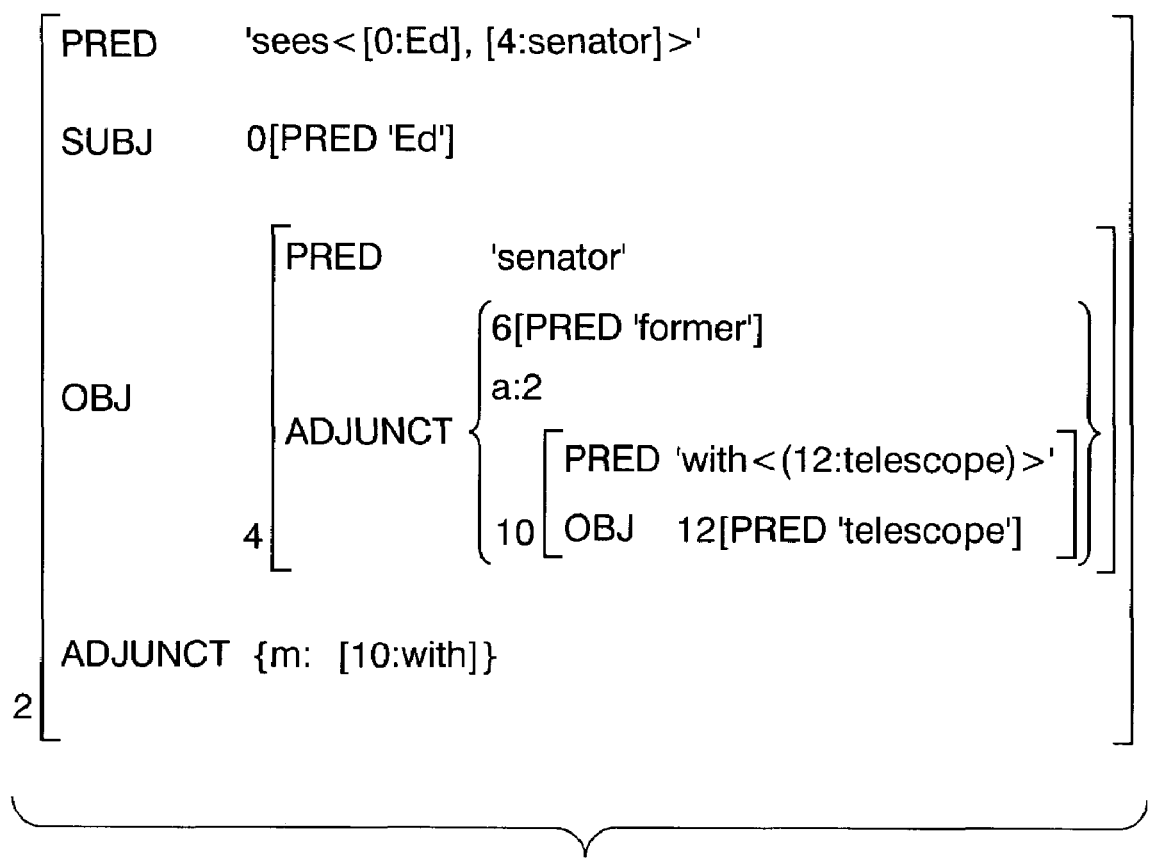
FIG. 5 is an exemplary packed functional structure or f-structure.

FIG. 5 shows an exemplary packed functional structure or packed f-structure, which incorporates context information to allow these two analyses to be represented in a single packed functional structure. The packed functional structure refers to two mutually exclusive and exhaustive context variables, a:1 and a:2. In other words, exactly one of a:1 or a:2 is true. If a:1 is true, then the context is one where the prepositional phrase "with the telescope" 10 modifies, or is an adjunct of, the phrase "Ed sees the former senator" 2. In context a:2, the prepositional phrase "with the telescope" 10 modifies the phrase "the former senator" 6.

In addition to the syntactic ambiguity, the example sentence also contains semantic ambiguity. For example, with respect to the context specified by context variable a:1, the phrase "the former senator" is modified by the phrase "with the telescope". This sentence could mean either: a) a former senator who now has a telescope; or b) someone who was formerly a senator that had a telescope, and may either now not have the telescope or not now be a senator. The two semantic ambiguities arise from the different semantic scopes of the two modifiers: 1) "former" and 2) "with the telescope". The two possibilities are not represented within the functional structure, the packed functional structure or the constituent structure.

Fragments of linear logic can be used to assemble meanings of words and phrases in such a way as to represent the various semantic scoping possibilities. In "Efficient Linear Logic Meaning Assembly" in Proc. COLING-ACL 98, Montreal, Canada, Aug. 10–14, 1998 by Vineet Gupta and John Lamping, it is shown how compact representations of scope possibilities can be efficiently computed.

Figure 2:
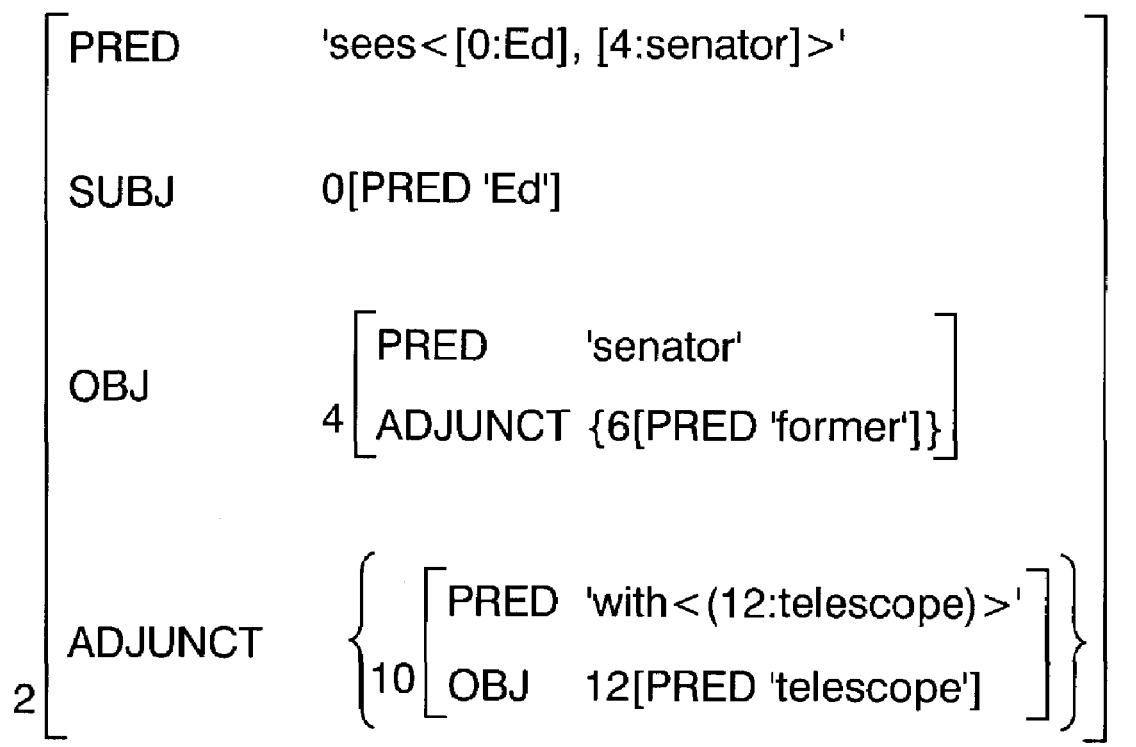
FIG. 2 is a first exemplary functional structure or f-structure of an exemplary ambiguous sentence.
Figure 4:
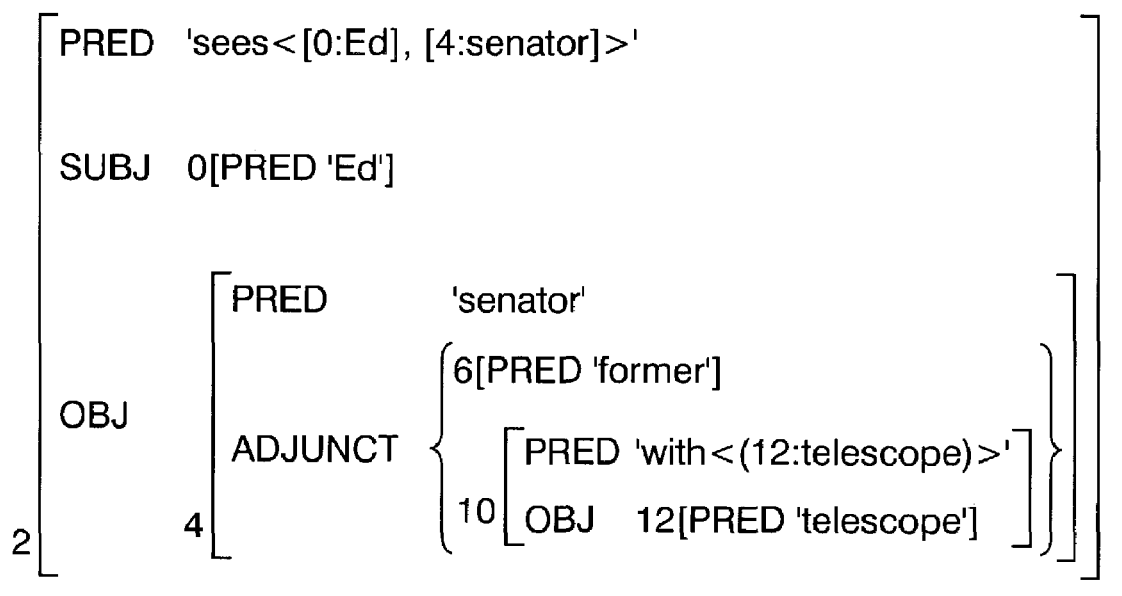
FIG. 4 is a second exemplary functional structure or f-structure of an exemplary ambiguous sentence.

However, the conventional systems and methods described above can only be applied to unpacked, syntactically unambiguous functional structures such as those shown in FIGS. 2 and 4. Thus, in the conventional systems and methods discussed above, the words as shown in FIG. 4, are assigned meaning constructors as follows:

TABLE 1

| Ed       | s(0)  |          |          |
|----------|-------|----------|----------|
| Senator  | s(4)  |          |          |
| see      | s(0)  | -o s(4)  | -o s(2)  |
| Telescope| s(12) |          |          |
| former   | s(4)  | -o s(4)  |          |
| With     | s(12) | -o s(4)  | -o s(4)  |

A meaning constructor is comprised of a portion on the left hand side of the colon and a portion on the right hand side of the colon in table 1. The left hand side portion is an expression in the meaning language. The right hand side portion is a linear logic formula representing the expression in the meaning language on the left hand side. For example, the atomic propositions $s(0)$, $s(2)$ and $s(4)$ represent the semantic contributions made by the numbered nodes in the functional structure while the symbol "-o" represents linear implication.

Thus, the entry "Ed: s(0)" indicates that node 0 contributes the meaning "Ed". The entry "senator: s(4)" indicates that node 4 contributes the meaning "senator". The entry "see: s(0) -o s(4) -o s(2)" indicates that the verb "see" consumes the semantics or meanings of "Ed" node 0 and the semantics of "senator" node 4 to produce the meaning of node 2. In particular, the contributions of "Ed" node 0 and "senator" node 4 provide the arguments to the predicate "see" node 2. The entry "telescope: s(12)" indicates that node 12 contributes the meaning "telescope". The entry "former: s(4) -o s(4)" indicates that the adjective "former" accepts the meaning of node 4 to produce a new, updated meaning for node 4.

In conventional linear logic meaning assembly, the computation of the meaning of the sentence proceeds by: (a) obtaining the six meaning constructors above; (b) using the right-hand linear logic sides of the constructors as premises to a linear logic derivation whose goal is to conclude s(2), where s(2) is the semantic contribution of the sentence level f-structure node, 2; and (c) applying the Curry-Howard isomorphism to the linear logic derivation to combine the meaning expressions on the right-hand sides of the constructors to build up a meaning expression for the conclusion s(2). In this example, we need only consider the rule of inference known as Modus Ponens, which corresponds according to the standard Curry-Howard isomorphism to a functional application of the meaning terms.

The rule of inference is:

$$\frac{A{:}a \quad B{:}a-ob}{B(A){:}b} \quad \begin{array}{c}\text{from } a; \text{ and } a \text{ implies } b\\ \text{conclude}\\ b \text{ (and applying the meaning of "a implies b" to}\\ \text{the meaning of } a).\end{array}$$

Applying this rule yields the following two distinct derivations:

Derivation 1:

$$\frac{s(0) \quad s(0)-o\,s(4) \quad -o\,s(2) \quad \dfrac{s(12) \quad s(12)-o\ s(4)\ -o\,s(4)}{\dfrac{s(4) \quad s(4)\ -o\,s(4)}{s(4) \quad s(4)\ -o\ s(4)}}}{\dfrac{s(4)-o\,s(2) \qquad s(4)}{s(2).}}$$

Derivation 1 thus computes the following meaning for s(2): see(Ed, former(with(telescope,senator))).

Derivation 2:

$$\dfrac{\dfrac{s(0)s(0)-}{os(4)-o\ s(2)}\quad \dfrac{s(4)\ s(4)\ -o\,s(4)\ s(12)\ \dfrac{s(12)\ -o\,s(4)\ -o\,s(4)}{s(4)\ -o\,s(4)}}{s(4)}}{\dfrac{s(4)\ -o\,s(2) \qquad s(4)}{s(2)}}$$

Derivation 2 thus computes the following meaning for s(2): see(Ed, with(telescope, former(senator))).

The method for representing scope ambiguities starts by noting that in derivations 1 and 2 discussed above, there are the following common sub-derivations of the modifiers:

(a) former: s(4) -o s(4)

$$\frac{\text{telescope: } s(12) \text{ with: } s(12) \quad -o\ s(4) \quad -o\ s(4)}{\text{with (telescope): } s(4) \quad -o\ s(4)} \quad \text{(b)}$$

Thus, the two derivations arise from the different orders in which the "s(4) -o s(4)" implications can be applied to the "s(4)" meaning. Thus, given the case of N modifiers of a type "a -o a", there will be exponential growth in the number of derivations since there are N! (N factorial) different orders in which the modifiers can be applied to "a".

The conventional method for representing scope ambiguity performs a series of partial derivations. When any of the partial derivations concludes with a modifier of a type equivalent to "a -o a", the partial derivation is left to one side. For nearly all cases of naturally occurring linguistic input, this process will lead in linear time to a single skeleton derivation that represents the core unmodified meaning of the sentence plus a set of modifier derivations representing modifiers that can be applied to the core meaning.

For example, the derivation:

$$\frac{Ed: s(0) \text{ see: } s(0) \quad -o\ s(4) \quad -o\ s(2)}{\frac{\text{see }(Ed): s(4) \quad -o\ s(2) \text{ senator: } s(4)}{\text{see }(Ed, \text{ senator}): s(2),}}$$

and the two modifier derivations (a) and (b) discussed above can be computed in linear time. The two modifiers can then be inserted in any order into the skeleton derivation at the "senator: s(4)" sub-conclusion.

The conventional methods of linear logic meaning assembly rely on careful accounting to make sure that each part of the parse contributes exactly once to the meaning. However, in the packed functional structure approach, some parts of the packed functional structure are only present in some readings of the meaning. Therefore, the careful accounting system of linear logic meaning assembly used in representing quantifier scope and semantic ambiguity will not work with the packed functional structures useful in representing the lexical and attachment ambiguities of syntactic ambiguity.

Therefore, in various exemplary embodiments according to this invention, methods for efficient ambiguous meaning assembly are provided that allow the linear logic meaning assembly logic to access the information contained within packed functional structures. In various other exemplary embodiments, skeleton and modifier determinations are applied to the contexted linear logic to determine a representation of quantifier scope and attachment ambiguity that uses a skeleton modifier representation wherever possible for efficiency. When a skeleton modifier representation is not possible, a contexted linear logic representation is used in a combined representation that provides for uniform processing of syntactic and semantic scope ambiguities.

Figure 6:
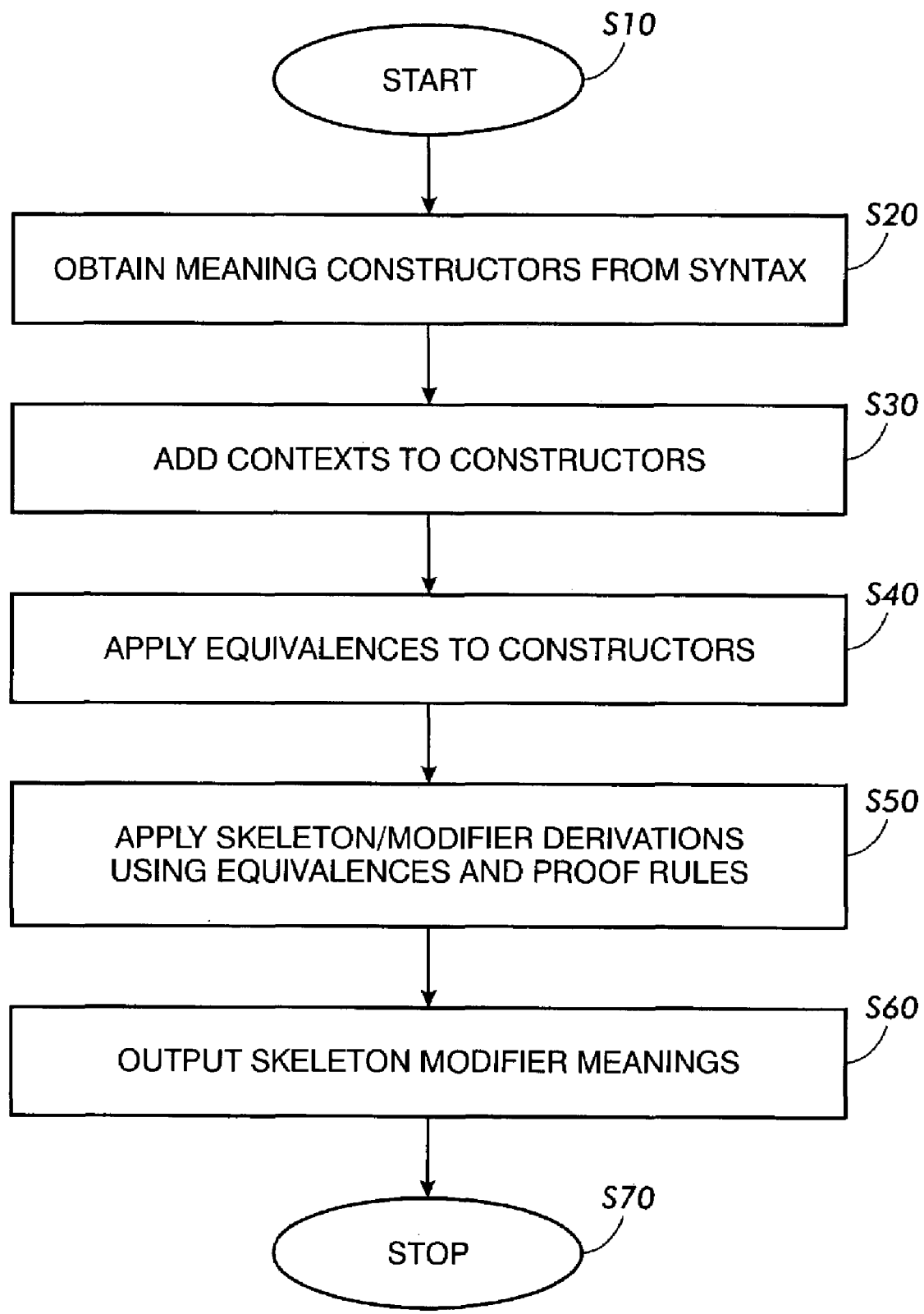
FIG. 6 is an exemplary flowchart for generating efficient ambiguous meaning according to this invention.

FIG. 6 shows an exemplary method for efficient ambiguous meaning assembly using contexted linear logic according to this invention. The process begins at step S10 and immediately continues to step S20. In step S20, premises are obtained from syntactic analysis. It will be apparent that step S20 is not restricted only to obtaining premises from packed f-structures. The step is applicable to any other form of syntactic representation to which Linear Logic Meaning Assembly has been or can be applied, including the attribute value matrices of Head-Driven Phrase Structure Grammar (Asudeh & Crouch, "Glue semantics for HPSG", in on-line proceedings of HSPG'01 conference, 2002), the derivation trees of Tree Adjoining Grammar (Frank & van Genabith, "Glue TAG: Linear logic based semantics construction for LTAG", in on-line proceedings of LFG'01 conference, 2001) and D-Tree Grammar (Hepple, "A functional interpretation scheme to D-Tree Grammars", in Proceedings $3^{rd}$ International Workshop on Computational Semantics, 1999), and the syntactic derivations of Categorial and Type-Logical Grammar. After the premises are obtained, control continues to step S30.

In step S30, the context information that is derived from the packed syntactic representation is added to each proposition as shown below:

(1) proposition::=context:proposition.

Control then continues to step S40.

In step S40, equivalences for the contextualized system are applied to the contexted premises. It will be apparent that the contextualized system is a combination of two logics, a base logic and a logic of contexts. In most realistic applications, the context logic will be classical propositional logic. However, the method for contextualizing a base logic is independent of the particular base logical system, and classical propositional or predicate logic, intuitionistic propositional or predicate logic, classical or intuitionistic modal logic, description logic, or any other known or later developed logic system can be used as a base logic in various exemplary embodiments of the systems and methods according to this invention. The following equivalences and proof rules apply when the base logic is the multiplicative glue fragment of linear logic and the context logic is classical propositional logic:

| | | |
|---|---|---|
| (3) | c1 ∨ c2:P = | c1:P ⊗ c2:P provided that c1∧c2 = false |
| (4) | c1:P(T1) ⊗ c2:P(T2) = | c1 ∨ c2:P({c1:T1, c2:T2}) provided that C1∧C2 = false |
| (5) | c:d:P = | c∧d:P |
| (6) | c:P = | d:P provided c = d |
| (7) | true:P = | P |
| (8) | false:P = | 1 |
| (9) | c:(P ⊗ Q) = | c:P ⊗ c:Q |
| (10) | c:(P -o Q) = | c:p -o c:Q |
| (11) | c:(∀x.P) = | ∀x. c:P |

Proof Rules:

| | | |
|---|---|---|
| Delta | ⊢ B | if Gamma = Delta, A = B |
| Gamma | ⊢ A | |
| Gamma | ⊢ A | |
| c:Gamma | ⊢ c:A | |

The first set of equivalences in (3)–(8) provide the basic definition of what it means to be in a context. These equivalences illustrate that a bare proposition is the same as that proposition in the universal context. Moreover, given a context and a disjoint decomposition of that context, a proposition in a context is equivalent to the product of that proposition in each decomposition.

The second set of equivalences show that context can float down through connectives. Therefore, adding context is independent of any particular base logic system. For example, the proposition c: ((d: A) -o B), is equivalent to (c∧d:A) -o (c:B).

It should be appreciated that classical propositional or predicate logic, intuitionistic propositional or predicate logic, classical or intuitionistic modal logic, description logic, or any other known or later developed logic system can be used in the practice of this invention. For example, given a formula within a top level proposition, the context of the proposition occurs in the conjunction of all contexts logically above it in the tree of propositions. In the exemplary proposition c: (d: A-o B), A occurs in the context c∧d. It should be noted that a formula with disjunctive terms is treated as the product of the contextualized formulas in accordance with the second equality rule.

The proof rules for the contextualized system lift the standard proof rules of the base logic into proof rules for the contextualized system.

The following theorems about the sub-context of this system can be proven.

If a formula P occurs in a proof Gamma⊢-A, the context in which P occurs is a disjunction of some or all of the contexts where it occurs in Gamma and A.

Proof: By induction on the size of the proof. Since the original rules all have the sub-formula property, which is stronger than the sub-context property, we need only show that the new rule preserves the theorem. We therefore look at the equality rules that could have proved the equality of the new rules uses.

All equalities preserve formula context and thus the sub-context property except the split equality and the false equality. The split equality trivially satisfies the sub-context from right to left and also satisfies it going from left to right, as the disjunction of the context P that occurs on the right is exactly the context that occurs on the left. The false equality vacuously satisfies the implication, as P occurs in the false context that implies all others.

Narrowing: If Gamma⊢-A then c:Gamma⊢-c:A

Proof: By induction in the size of the proof. A proof of c:Gamma⊢-c:A from the last step of Gamma⊢-A and the induction hypothesis is constructed.

If the last step of the original proof was one of the original rules, the new proof is constructed by using the new rule to push the "c:" inside the connective eliminated by the rule of the original proof. The rule from the original proof is then applied. The subproofs it requires will now all be related to the subproofs of the original proof by the induction hypothesis.

If the last step of the original proof was the new rule, then the same rule can be used in the new proof, just with the context "c" added to the propositions, because adding a context to both sides preserves equality. Again, the new subproof is related to the original subproof by the induction hypothesis.

False Elimination: Given a proof of Gamma⊢-A, the result of replacing all propositions that occur in the false context with 1 and simplifying is still a proof.

Proof: This is just a special case of the principle that uniformly replacing several different atoms with the same atom preserves being a proof, and that simplifying vacuous 1's preserves being a proof.

Widening: if Gamma⊢-A and all atomic formulas in the proof are in the same non-false context, c, throughout the proof, then Gamma\c⊢-A, where P\c is the result of removing the contextualization on c from the entire proof.

Proof: if all atomic formulas in the proof occur in the same non-false context, c, then the proof doesn't use the split or false equalities or term disjunctions and the other equality rules don't affect the formula. Therefore, none of the uses of the new rule in the proof affects the formula. The context can be removed from all formulas in the proof. The equality rules can be removed from the proof, as the two sides of equalities will be the same, since they differed only in context forms. Meanwhile, the original rules will still be correct, as formulas that matched with the context will still match with the context removed.

Conservative extension: if Gamma⊢-A is a proof in the contextualized system where Gamma and A are not contextualized, then there is a proof of Gamma⊢-A in the non-contextualized system.

Proof: The only rule that can introduce contextualization is the split equality rule. Some occurrence of that rule is chosen. A non-false case, "c1", is chosen from the use of the rule, and the narrowing theorem is used to convert the proof to c1:Gamma⊢-c1:A. Since c1∧c2=false, false elimination can be used to remove the split. Now the rule does not need to be split. This process is continued for all the split rules to generate a proof of c1∧ ... ∧cn:Gamma⊢-c1∧ ... cn:A, where all propositions are in the same context throughout the proof. By the widening theorem, a proof of Gamma⊢-A with no contextualization is obtained. In other words, a non-contextualized system is obtained.

Therefore, based on the contexted linear logic propositions obtained after step S30 from the exemplary packed functional or f-structure of FIG. 5 the following equivalences are obtained:

TABLE 2

|     | Ed:        | s(0)  |    |      |    |      |
|-----|------------|-------|----|------|----|------|
|     | senator:   | s(4)  |    |      |    |      |
|     | see:       | s(0)  | -o | s(4) | -o | s(2) |
|     | telescope: | s(12) |    |      |    |      |
|     | former:    | s(4)  | -o | s(4) |    |      |
| a2: | with:      | s(12) | -o | s(4) | -o | s(4) |
| a1: | with:      | s(12) | -o | s(2) | -o | s(2) |

It should be appreciated that, in the context "a2", the term "with" modifies the noun s(4), and in the context "a1", the term "with" modifies the verb s(2). It should also be noted that:

a1∨a2=true; and a1∧a2=false.

Successive applications of equivalences obtain the stages 12–147 as follows:

(12) a2:with: s(12) -o s(4) -o s(4)⊗a1:with: s(12) -o s(2) -o s(2)

(13) a1∨a2: with: s(12) -o {a2: s(4) -o s(4), a1: s(2) -o s(2)}

(14) with: s(12) -o {a2: s(4) -o s(4), a1: s(2) -o s(2)}

In particular, stage 12 is obtained as the conjunction of premises, while step 13 is obtained via equivalence (4) and stage 14 is obtained via equivalence (7). Equivalences are applied in the left-to-right direction in order to merge premises and minimize the degree to which sub-parts of premises are placed in different contexts. Control then continues to step S50.

In step S50, a contexted skeleton-modifier derivation is performed using the equivalences and proof rules outlined above. In various exemplary embodiments of the systems and methods according to this invention, the following proof strategy is applied. First, (a) formulas differing in context are merged by applying equivalences in the left-to-right direction. Next, (b) when all possible merges have occurred, proof rules are applied in accordance with a standard proof strategy. Finally, (c) when the proof rules have been applied, contexts are split according to the following rule:

a1:T1:g, b2:T2:g -o h→a1∧b2:T2(T1):h, a1∧~b2:T1:g, ~a1∧b2:T2:g -o h

These steps (a)–(c) are then repeated until the goal conclusions are derived.

As with skeleton-modifier derivations in an uncontexted system, a skeleton derivation plus any modifier derivations is obtained in step S50. In various exemplary embodiments, the following modifiers and skeleton are obtained by combining the reduced form premise in stage (14) to derive the contexted modifier:

$$\text{with: } s(12)\text{-}o\{a2: s(4)\text{-}o\,s(4), a1: s(2)\text{-}o\,s(2)\} \quad \text{telescope: } s(12)$$
$$\text{with (telescope): } \{a2: s(4)\text{-}o\,s(4), a1: s(2)\text{-}o\,s(2)\}$$

A trivial derivation is then performed to obtain the uncontexted modifier:

former : a(4) -o s(4).

The remaining premises can be combined independently of contexts to give the following skeleton derivation:

$$\frac{ed: s(0) \quad see: s(0) \; -o\,s(4) \; -o\,s(2)}{see\,(ed): s(4) \; -o\,s(2) \quad senator: s(4)}$$
$$see(ed, senator): s(2).$$

In step S60, the following three interpretations of meaning shown in stages 15–17 for the original sentence can now be read off using these components.

| (15) | In context a1: | | | |
|---|---|---|---|---|
| | with (telescope): | s(2) | -o | s(2) |
| | modifies | | | |
| | see (ed, senator): | s(2) | | |
| | former: | s(4) | -o | s(4) |
| | modifies | | | |
| | senator: | s(4). | | |
| (16) | In context a2, | | | |
| | with (telescope): | s(4) | -o | s(4) |
| | modifies | | | |
| | senator: | s(4) | | |
| | to give | | | |
| | with (telescope) (senator): | s(4). | | |
| (19) | In context a2, | | | |
| | former: | s(4) | -o | s(4) |
| | modifies | | | |
| | senator: | s(4) | | |
| | to give | | | |
| | former (senator): | s(4) | | |
| | with (telescope): | s(4) | -o | s(4) |
| | modifies | | | |
| | former(senator): | s(4) | | |
| | to give | | | |
| | with (telescope)(former (senator)): | s(4). | | |

Control then continues to step S70, where the process ends.

An alternative method for contexted meaning assembly proceeds from step S10 through to step S40, but does not create separate contexted skeleton and modifier derivations. Instead, it uses the equivalences and proof rules of the contextualized system to search directly for contexted derivations of the sentence meaning, without passing through intermediate contexted derivations of skeleton and modifier derivations. In typical cases, this leads to multiple derivations of alternate contexted meanings, instead of a single set of contexted skeleton-modifier derivations from which multiple meanings can be read off. However, the contexted system still allows for a lesser number of common components to be shared across contexts, reducing the total number of derivations that need to be performed. To further increase efficiency, conventional tabular theorem proving techniques, such as, for example, "Memoisation for glue language deduction and categorial parsing" by Mark Hepple, COLING-ACL'98, Montreal, 1998, can be adapted to the contexted system. This still results in the direct, though less efficient, production of multiple alternate contexted derivations.

Thus, using the systems and methods according to this invention, the various interpretations of ambiguity contained in the sentence can be derived without having to perform three separate logical derivations. Also, the contexted logic allows common components of the derivations to be shared across contexts. The above methods of operation may be applied in any number of applications other than the applications specifically described above.

While this invention has been described with specific embodiments thereof, it is evident then many alternatives, modifications and variations will be apparent to those skilled in the art. Accordingly, the exemplary embodiments of the illustrative, not limiting. Various the spirit and scope of the invention.

What is claimed is:

1. A method for contextualizing a base logic with an additional logic of contexts to produce a single contexted derivation for a natural language expression, comprising:
   pairing context formulas with labeled or unlabeled base logic formulas;
   applying equivalences to move contexts through base logic terms and formulas; and
   applying proof rules and equivalences to fold to multiple base logic derivations across contexts into the single contexted derivation,
   wherein the single contexted derivation represents both syntactic ambiguity and semantic scope ambiguity of phrases or words in the natural language expression.

2. A method for efficient ambiguous meaning assembly from a set of premises derived from a packed syntactic analysis of a natural language expression, comprising:
   determining a context for each premise on the basis of the context labeling its syntactic origin;
   performing a contexted derivation using the method of claim 1 and a tabular theorem prover adapted to the contexted logic; and
   storing the contexted derivation.

3. A method for efficient ambiguous meaning assembly from a set of premises derived from a packed syntactic analysis of a natural language expression, comprising:
   determining a context for each premise on the basis of the context labeling its syntactic origin;
   determining a first derivation of the contexted production terms based on logical equivalences;
   determining a contexted modifier derivation based on the first derivation for a first set of productions;
   determining a skeleton and modifier derivation based on the first derivation for a second set of productions; and
   storing the skeleton and modifier derivation.

4. The method according to claim 1, wherein the equivalences comprise:
   (a) $c1_\vee c2:P = c1:P \otimes c2:P$ provided that $c1_\wedge c2 =$ false
   (b) $c1:P(T1) \otimes c2:P(T2) = c1_\vee c2:P(\{c1:T1, c2:T2\})$ provided that $c1_\wedge c2 =$ false (c) $c{:}d{:}P = c_\wedge d{:}P$
(d) $c{:}P = d{:}P$ provided $c=d$
(e) true$:P=P$
(f) false$:P=1$
(g) $c{:}(P \otimes Q) = c{:}P \otimes c{:}Q$
(h) $c{:}(P \multimap Q) = c{:}p \multimap c{:}Q$
(i) $c{:}(\forall x.P) = \forall x.c{:}P$.

5. The method according to claim 1, wherein the proof rules comprise:

Delta ⊢B if Gamma=Delta, A=B
Gamma ⊢A
Gamma ⊢A
c:Gamma ⊢c:A.

6. The method according to claim 3, wherein the first set of productions comprise:
(a) $c1_\vee c2{:}P = c1{:}P \otimes c2{:}P$ provided that $c1_\wedge c2$=false
(b) $c1{:}P(T1) \otimes c2{:}P(T2) = c1_\vee c2{:}P(\{c1{:}T1, c2{:}T2\})$ provided that $c1_\wedge c2$=false (c) $c{:}d{:}P = c_\wedge d{:}P$
(d) $c{:}P = d{:}P$ provided $c=d$
(e) true$:P=P$
(f) false$:P=1$
(g) $c{:}(P \otimes Q) = c{:}P \otimes c{:}Q$
(h) $c{:}(P \multimap Q) = c{:}p \multimap c{:}Q$
(i) $c{:}(\forall x.P) = \forall x.c{:}P$.

7. The method according to claim 3, wherein the second set of productions comprise:

Delta ⊢B if Gamma=Delta, A=B
Gamma ⊢A
Gamma ⊢A
c:Gamma ⊢c:A.

* * * * *